(12) United States Patent
Sturlaugson et al.

(10) Patent No.: US 11,238,417 B2
(45) Date of Patent: Feb. 1, 2022

(54) ADJUSTING MAINTENANCE INTERVALS FOR INDIVIDUAL PLATFORMS BASED ON OBSERVABLE CONDITIONS

(71) Applicant: The Boeing Company, Chicago, IL (US)

(72) Inventors: Liessman E. Sturlaugson, St. Louis, MO (US); Ranjan Kumar Paul, Sammamish, WA (US); Christopher David Deits, Renton, WA (US)

(73) Assignee: The Boeing Company, Chicago, IL (US)

( * ) Notice: Subject to any disclaimer, the term of this patent is extended or adjusted under 35 U.S.C. 154(b) by 82 days.

(21) Appl. No.: 16/805,678

(22) Filed: Feb. 28, 2020

(65) Prior Publication Data

US 2021/0272072 A1    Sep. 2, 2021

(51) Int. Cl.
*G06Q 10/00* (2012.01)
*G06Q 10/06* (2012.01)
*G06Q 30/00* (2012.01)

(52) U.S. Cl.
CPC ....... *G06Q 10/20* (2013.01); *G06Q 10/06316* (2013.01); *G06Q 30/018* (2013.01)

(58) Field of Classification Search
CPC .......................................... G06Q 10/00–50/00
(Continued)

(56) References Cited

U.S. PATENT DOCUMENTS 7,457,763 B1 * 11/2008 Garrow ................. G06Q 10/06
705/7.24

7,895,047 B2 * 2/2011 Wetzer ............... G06Q 10/0875
705/305
(Continued)

FOREIGN PATENT DOCUMENTS

| CA | 2874943 A1 | * | 12/2013 | ............. G06Q 10/20 |
| CN | 106874238 B | * | 7/2020 | ............. G06F 17/18 |
| EP | 3379359 A1 | | 9/2018 | |

OTHER PUBLICATIONS

Kaiser, Kevin A., and Nagi Z. Gebraeel. "Predictive maintenance management using sensor-based degradation models." IEEE Transactions on Systems, Man, and Cybernetics-Part A: Systems and Humans 39.4 (2009): 840-849. (Year: 2009).*
(Continued)

*Primary Examiner* — Alan S Miller
(74) *Attorney, Agent, or Firm* — Yee & Associates, P.C.

(57) ABSTRACT

A maintenance interval adjuster and methods for improving accuracy of maintenance scheduling and changing a maintenance interval are presented. Scheduled maintenance data and unscheduled in-service maintenance data for a maintenance task are retrieved for a plurality of platforms. A distribution of lifetimes for the maintenance task in the scheduled maintenance data and unscheduled in-service maintenance data are analyzed for high variance or multiple modes. A number of conditions in sensor data of the plurality of platforms correlated to a length of the lifetimes for the maintenance task is identified, in response to identifying at least one of high variance or multiple modes in the distribution of lifetimes. The lifetimes are divided into a plurality of groups based on the number of conditions. A respective recommended maintenance interval is determined for each group of the plurality of groups based on respective lifetimes for the maintenance task of a respective group.

20 Claims, 8 Drawing Sheets

(58) Field of Classification Search
USPC .............................................. 705/7.11–7.42
See application file for complete search history.

(56) References Cited

U.S. PATENT DOCUMENTS

| | | | |
|---|---|---|---|
| 8,117,007 B2 | 2/2012 | Yitbarek et al. | |
| 9,701,420 B1* | 7/2017 | Tucker | G07C 5/008 |
| 10,318,904 B2* | 6/2019 | Johnson | G06Q 10/087 |
| 10,430,741 B2* | 10/2019 | Spiro | G06Q 10/0631 |
| 2002/0143421 A1* | 10/2002 | Wetzer | G06Q 10/06314 |
| | | | 700/100 |
| 2005/0055239 A1* | 3/2005 | Farmer | G06Q 30/0601 |
| | | | 705/7.11 |
| 2008/0125933 A1* | 5/2008 | Williams | G06Q 10/08 |
| | | | 701/29.5 |
| 2008/0177613 A1* | 7/2008 | Chan | G06Q 10/0631 |
| | | | 705/7.12 |
| 2009/0083050 A1* | 3/2009 | Eltman | G06Q 10/06 |
| | | | 705/305 |
| 2009/0125277 A1* | 5/2009 | Wetzer | G06Q 10/20 |
| | | | 702/184 |
| 2010/0070237 A1* | 3/2010 | Yitbarek | G06Q 50/30 |
| | | | 702/177 |
| 2011/0029824 A1* | 2/2011 | Scholer | G05B 23/0224 |
| | | | 714/47.3 |
| 2011/0137697 A1* | 6/2011 | Yedatore | G06F 11/0748 |
| | | | 705/7.13 |
| 2011/0245999 A1* | 10/2011 | Kordonowy | G05D 1/0066 |
| | | | 701/3 |
| 2014/0121885 A1* | 5/2014 | Schoonveld | G06Q 10/10 |
| | | | 701/29.3 |
| 2014/0278239 A1* | 9/2014 | Macaro | G06F 17/18 |
| | | | 702/181 |
| 2014/0350989 A1* | 11/2014 | Telatar | G06Q 10/1097 |
| | | | 705/7.21 |
| 2015/0227838 A1* | 8/2015 | Wang | G06N 7/00 |
| | | | 706/12 |
| 2016/0133066 A1* | 5/2016 | Lavie | G07C 5/08 |
| | | | 701/31.4 |
| 2016/0350671 A1* | 12/2016 | Morris, II | G06N 20/00 |
| 2017/0192414 A1* | 7/2017 | Mukkamala | H04L 63/0823 |
| 2017/0323231 A1* | 11/2017 | Johnson | G06Q 10/06314 |
| 2017/0323274 A1* | 11/2017 | Johnson | G05B 23/0251 |
| 2018/0155060 A1* | 6/2018 | Dauenhauer | G05B 23/0283 |
| 2018/0240080 A1* | 8/2018 | Misra | G07C 5/006 |
| 2019/0066061 A1 | 2/2019 | Rencher et al. | |
| 2019/0080259 A1* | 3/2019 | Wang | G06N 20/00 |
| 2019/0304212 A1* | 10/2019 | Bailey | G07C 5/0825 |
| 2020/0210968 A1* | 7/2020 | Mojtahedzadeh | G06Q 10/063116 |
| 2020/0348662 A1* | 11/2020 | Cella | G05B 23/024 |
| 2021/0012270 A1* | 1/2021 | Lim | G06Q 10/063118 |

OTHER PUBLICATIONS

Extended European Search Report regarding European Application No. 21159773.7, dated Jul. 6, 2021, 9 pages.

* cited by examiner

ADJUSTING MAINTENANCE INTERVALS FOR INDIVIDUAL PLATFORMS BASED ON OBSERVABLE CONDITIONS

BACKGROUND INFORMATION

1. Field

The present disclosure relates generally to maintenance and more specifically to adjusting maintenance intervals for an individual platform.

2. Background

An apparatus, such as an aircraft, construction equipment, or an automobile, may periodically be taken out of service for the performance of scheduled maintenance on the apparatus. Maintenance is performed to ensure that all component parts are operating with efficiency and safety. Different maintenance tasks may need to be performed at different intervals than other maintenance tasks. For example, in an automobile, air filters may need to be checked and replaced more frequently than the tires or the timing belt. Therefore, different maintenance tasks are typically scheduled to occur at different intervals.

Maintenance tasks are provided with an original equipment manufacturer (OEM) recommended maintenance interval. An example of an original equipment manufacturer (OEM) recommended maintenance interval is changing oil in an automobile every 3,000 miles or three months.

Often OEM maintenance intervals are overly conservative. Following the OEM recommendation may result in inefficient and non-standard maintenance scheduling programs. Following an OEM may cause operators to perform non-value-added maintenance which may be an unnecessary cost burden. In such cases, the current overly conservative scheduling of maintenance tasks may be cost ineffective and result in performance of unnecessary maintenance procedures.

Therefore, it would be desirable to have a method and apparatus that takes into account at least some of the issues discussed above, as well as other possible issues.

SUMMARY

An example of the present disclosure provides a computer-implemented method. It is determined if sensor data of a platform indicates a condition affecting a frequency of a maintenance task. The maintenance interval for performing the maintenance task is changed for the platform to an updated value if a condition affecting the frequency of the maintenance task is indicated in the sensor data. The maintenance task is performed at or before the maintenance interval having the updated value.

Another example of the present disclosure provides a computer-implemented method of improving accuracy of maintenance scheduling. Scheduled maintenance data and unscheduled in-service maintenance data for a maintenance task for a plurality of platforms is retrieved. A distribution of lifetimes for the maintenance task in the scheduled maintenance data and unscheduled in-service maintenance data is analyzed for high variance or multiple modes. A number of conditions in sensor data of the plurality of platforms correlated to a length of the lifetimes for the maintenance task is identified in response to identifying at least one of high variance or multiple modes in the distribution of lifetimes. The lifetimes are divided into a plurality of groups based on the number of conditions. A respective recommended maintenance interval is determined for each group of the plurality of groups based on respective lifetimes for the maintenance task of a respective group.

Yet another example of the present disclosure provides an apparatus. The apparatus comprises a bus system; a communications system coupled to the bus system; and a processor unit coupled to the bus system, wherein the processor unit executes the computer-usable program code to retrieve scheduled maintenance data and unscheduled in-service maintenance data for a maintenance task for a plurality of platforms; analyze a distribution of lifetimes for the maintenance task in the scheduled maintenance data and unscheduled in-service maintenance data for high variance or multiple modes; identify, in response to identifying at least one of high variance or multiple modes in the distribution of lifetimes, a number of conditions in sensor data of the plurality of platforms correlated to a length of the lifetimes for the maintenance task; divide the lifetimes into a plurality of groups based on the number of conditions; and determine a respective recommended maintenance interval for each group of the plurality of groups by performing a customized maintenance program analysis on each of the plurality of groups.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

DETAILED DESCRIPTION

Figure 1:
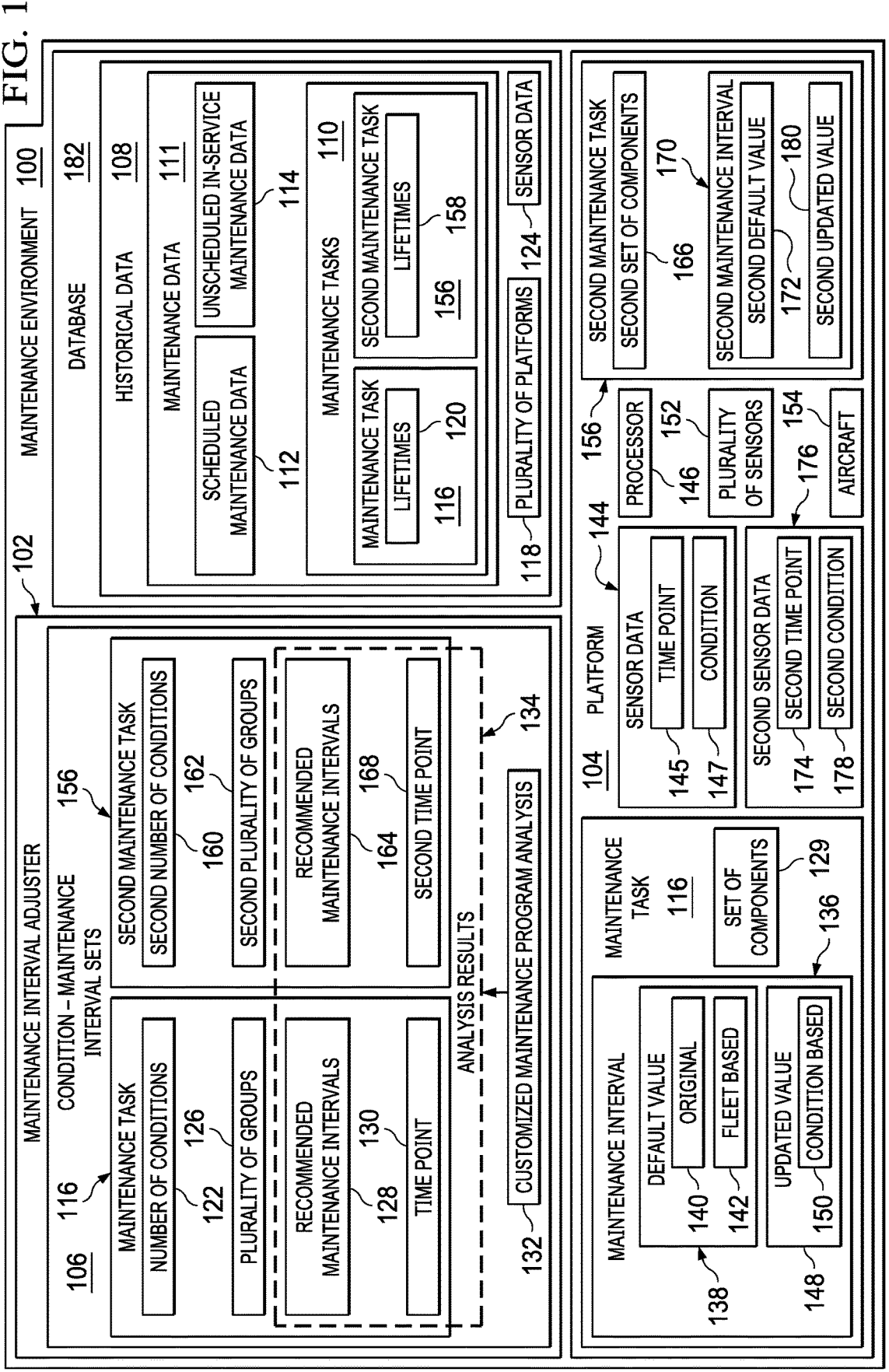
FIG. 1 is an illustration of a block diagram of a maintenance environment in which an illustrative example may be implemented.

The illustrative examples recognize and take into account one or more different considerations. The illustrative examples recognize and take into account that a maintenance interval can be measured in terms of usage cycles, usage time, or calendar days. The illustrative examples recognize and take into account that for an aircraft, a maintenance interval could be measured in a number of flight cycles, a number of flight hours, a number of calendar days, or any other desirable measurement type.

The illustrative examples recognize and take into account that currently, a customized maintenance program (CMP) can be provided to an individual aircraft operator, such as an airline. In the CMP process, the in-service data of the operator's fleet is analyzed and maintenance intervals for individual maintenance tasks are identified that have the potential to be changed in addition to the magnitude of the potential change. A possible result of a CMP analysis could be that a maintenance task interval can be lengthened such that the maintenance task is performed less frequently as compared the OEM's original recommended interval. Performing a maintenance task less frequently thereby saves the airline money due to a reduction in labor and materials cost associated with performance of the maintenance task. The illustrative examples recognize and take into account that the OEM's original, baseline intervals are determined according to the worldwide fleet of all operators and environments, whereas CMP is able to take advantage of differences in operator's environment, aircraft usage, maintenance approach, and other factors to decide on maintenance intervals that are designed for that particular operator.

The illustrative examples recognize and take into account that current customized airline maintenance program (CMP) process performs statistical analysis of the historical lifetimes of the maintenance tasks in question. By computing confidence intervals around the cumulative distribution function of the lifetimes, acceptable maintenance intervals can be determined for each scheduled maintenance task. The existing solution assumes the same maintenance interval for the operator's entire fleet. For tasks that exhibit high variance in the lifetimes, the CMP analysis must be overcautious by taking lower values for the lower bound of the confidence interval of the lifetime distributions. The illustrative examples recognize and take into account that this is potentially leaving value on the table for the operator, because they must perform more maintenance over the life of those higher-lifetime aircraft.

The illustrative examples recognize and take into account that today CMP is done fleet-wide for a particular operator. The illustrative examples recognize and take into account that it would be desirable to drill down another level to see if maintenance intervals can be designed for efficiency at the aircraft level in addition to the operator level. The illustrative examples recognize and take into account that to differentiate maintenance intervals at the aircraft level requires differentiation between aircraft in the fleet. However, the current CMP does not take into account the operational conditions of each specific aircraft, as observable from sensors and other data. The illustrative examples transform the CMP process by differentiating between groups of lifetimes based on observable conditions, thereby attempting to reduce the intra-group variance and allowing condition-based interval determination to potentially increase the maintenance interval for some groups.

The illustrative examples provide an apparatus and methods by which aircraft level maintenance interval recommendations can be done to determine regulatory-approved intervals for each aircraft based on its condition. The illustrative examples use the statistical distributions of populations of lifetimes to make maintenance interval recommendations. The illustrative examples expand the CMP process by considering multiple groups with multiple, potentially distinct distributions. The illustrative examples provide an apparatus and methods for determining which distribution applies to each aircraft based on its actual observable conditions.

The illustrative examples provide an apparatus and methods for improving individual aircraft routine maintenance interval. The illustrative examples consider manufacturer suggested routine maintenance interval on a system under review on an aircraft. The illustrative examples use an aircraft health management system sensor data on the system under review during each flight of the aircraft. The illustrative examples analyze the sensor data in light of the manufacturer suggested routine maintenance interval for the system under review.

The illustrative examples process the analyzed data in light of a plurality of historical system under review health and condition observations at manufactured suggested routine maintenance events. The illustrative examples provide the improved suggested routine maintenance interval for the system under review on the individual aircraft at a longer time interval than the manufactured suggested routine maintenance interval when warranted by the analyzed data. The illustrative examples transform the CMP process by differentiating between groups of lifetimes based on observable conditions, thereby attempting to reduce the intra-group variance and allowing condition-based interval determination to potentially increase the maintenance interval for some groups.

Turning now to FIG. 1, an illustration of a block diagram of a maintenance environment in which an illustrative example may be implemented. Maintenance environment 100 includes maintenance interval adjuster 102 configured to improve accuracy of maintenance scheduling. Maintenance interval adjuster 102 enables condition-based interval determination for platform 104 in maintenance environment 100.

Maintenance interval adjuster 102 identifies condition-maintenance interval sets 106 from historical data 108. Condition-maintenance interval sets 106 include maintenance tasks of maintenance tasks 110 that has groups of lifetimes discernable based on observable conditions.

A maintenance task is a task associated with inspecting, maintaining, repairing, and/or replacing a component or subcomponent. Maintenance tasks to be performed on an apparatus are typically scheduled based on the review and analysis of scheduled maintenance data only. The analysis and review of maintenance data does not include line station and operational maintenance data. Moreover, the current analysis and review does not use any scientific method to evaluate and analyze in-service data. In addition, the format of the scheduled maintenance data may not be submitted in a consistent manner and the submission by operators may be voluntary. Thus, the current scheduling of maintenance data may be identified based on a limited scope of data that does not represent all aspects of aircraft maintenance events.

A maintenance event is any event that is associated with maintenance, repair, or replacement of a component of the apparatus. A maintenance event may include, without limitation, a functional part failure, a system failure, loss of function, decreased function, service interrupt, corrosion, wear, slow response time, decreased efficiency, decreased fuel efficiency, loss of tire pressure, or any other event that necessitates maintenance, repair, or replacement of a component or subpart of a component.

Maintenance interval adjuster 102 retrieves maintenance data 111, including scheduled maintenance data 112 and un-scheduled in-service maintenance data 114, for a given platform type. A given platform type is a type or model of a particular platform. For example, if a platform is an aircraft, the platform type may include all aircraft of a particular model number, such as a Boeing 787. A platform type may also include all aircraft having one or more characteristics in common, such as, without limitation, all cargo aircraft, all aircraft that use the same engine model, or any other characteristic. Thus, a platform type may include the same or similar types of platform.

Although the illustrative examples for an illustrative example are described with respect to an aircraft, an illustrative example may be applied to other types of platforms. The platform may be, for example, a mobile platform, a stationary platform, a land-based structure, an aquatic-based structure, and a space-based structure. More specifically, the platform may be a surface ship, a tank, a personnel carrier, a train, a spacecraft, a space station, a satellite, a submarine, an automobile, a power plant, a bridge, a dam, a house, a manufacturing facility, a building, and other suitable platforms.

To improve the accuracy of maintenance scheduling for maintenance task 116, maintenance interval adjuster 102 retrieves scheduled maintenance data 112 and unscheduled in-service maintenance data 114 for maintenance task 116 for plurality of platforms 118. Maintenance interval adjuster 102 analyzes a distribution of lifetimes 120 for maintenance task 116 in scheduled maintenance data 112 and unscheduled in-service maintenance data 114 for high variance or multiple modes. High variance or multiple modes in lifetimes 120 indicates a possibility of different distinguishable groups in lifetimes 120.

Multiple modes are identified using any desirable test. In some illustrative examples, multiple modes are identified using one of Silverman's test, the Hall and York test, the excess mass test, or Bayesian mixture models. In some illustrative examples, multiple modes are identified using kernel density estimates or histogram-based methods known to those skilled in the art.

Maintenance interval adjuster 102 identifies, in response to identifying at least one of high variance or multiple modes in the distribution of lifetimes 120, number of conditions 122 in sensor data 124 of plurality of platforms 118 correlated to a length of lifetimes 120 for maintenance task 116.

Maintenance interval adjuster 102 divides lifetimes 120 into plurality of groups 126 based on number of conditions 122. The plurality of groups 126 can have any quantity of groups that can be identified by an identifiable condition.

Maintenance interval adjuster 102 determines a respective recommended maintenance interval for each group of plurality of groups 126 based on respective lifetimes 120 for maintenance task 116 of a respective group. Recommended maintenance intervals 128 for plurality of groups 126 are based on lifetimes 120 for maintenance task 116. Each of the respective recommended maintenance intervals 128 is an interval of time between performances of maintenance task 116 that maximizes a probability that anomalies associated with set of components 129 are detected on a respective platform during preventive scheduled maintenance.

Maintenance interval adjuster 102 calculates time point 130 after which an acceptable amount of sensor data is available for a platform, such as platform 104, such that an analysis can be performed to determine if number of conditions 122 is present for the platform. Time point 130 can be measured in terms of usage cycles, usage time, or calendar days. When platform 104 is aircraft 154, time point 130 is measured in a number of flight cycles, a number of flight hours, a number of calendar days, or any other desirable measurement type. In some illustrative examples, time point 130 is described as a minimum quantity of cycles.

In some illustrative examples, maintenance interval adjuster 102 determines the respective recommended maintenance interval by performing customized maintenance program analysis 132 on each of plurality of groups 126. In some illustrative examples, analysis results 134 of performing customized maintenance program analysis 132 on plurality of groups 126 are sent to regulatory authorities for approval. Each of the distinct maintenance intervals is preapproved by the regulatory authorities based on the ability to monitor the condition and the statistical CMP analysis of each interval.

Platform 104 has maintenance task 116 with maintenance interval 136. Maintenance interval 136 initially has default value 138. Default value 138 can be original 140 such as an original equipment manufacturer (OEM) recommended maintenance interval. Default value 138 can be fleet based 142. When default value 138 is fleet based 142, default value 138 is determined using a statistical analysis of data for all platforms of plurality of platforms 118 for maintenance task 116.

In some illustrative examples, unscheduled downtime of platform 104 can be reduced by changing maintenance interval 136 for performing maintenance task 116 for platform 104. When maintenance task 116 has an associated plurality of groups 126 and platform 104 has time point 145 greater than or equal to time point 130, sensor data 144 of platform 104 is analyzed for number of conditions 122. In some illustrative examples, processor 146 of platform 104 determines if sensor data 144 of platform 104 indicates condition 147 affecting a frequency of maintenance task 116.

Maintenance interval 136 for performing maintenance task 116 for platform 104 is changed to updated value 148 if condition 147 affecting the frequency of maintenance task 116 is indicated in sensor data 144. In these illustrative examples, updated value 148 is condition based 150. When sensor data 144 does not indicate condition 147 affecting the frequency of maintenance task 116, maintenance interval 136 remains at default value 138.

In some illustrative examples, sensor data 144 includes manually generated and automatically generated data. In some illustrative examples, sensor data 144 includes pilot generated data. In some illustrative examples, sensor data 144 is generated by plurality of sensors 152. Plurality of sensors 152 includes any desirable quantity or type of sensors. In some illustrative examples, plurality of sensors 152 includes at least one of a temperature sensor, a pressure sensor, a proximity sensor, a force sensor, a light sensor, a humidity sensor, a displacement sensor, an electric current sensor, or any other desirable type of sensor. Plurality of sensors 152 are located at any desirable position on or in platform 104.

The type of condition 147 and the type of sensors in plurality of sensors 152 are at least tangentially related to set of components 129 or maintenance task 116. For example, condition 147 is a temperature of a component of set of components 129. As another example, condition 147 is exposure to an amount of pressure to a component of set of components 129. In some illustrative examples, platform 104 is aircraft 154 and sensor data 144 is flight sensor data.

In some illustrative examples, changing maintenance interval 136 to updated value 148 decreases maintenance interval 136. In some illustrative examples, changing maintenance interval 136 to updated value 148 increases maintenance interval 136.

To improve the accuracy of maintenance scheduling for second maintenance task 156, maintenance interval adjuster 102 retrieves scheduled maintenance data 112 and unscheduled in-service maintenance data 114 for second maintenance task 156 for plurality of platforms 118. Maintenance interval adjuster 102 analyzes a distribution of lifetimes 158 for second maintenance task 156 in scheduled maintenance data 112 and unscheduled in-service maintenance data 114 for high variance or multiple modes. High variance or multiple modes in lifetimes 158 indicates a possibility of different distinguishable groups in lifetimes 158.

Maintenance interval adjuster 102 identifies, in response to identifying at least one of high variance or multiple modes in the distribution of lifetimes 158, second number of conditions 160 in sensor data 124 of plurality of platforms 118 correlated to a length of lifetimes 158 for second maintenance task 156.

Maintenance interval adjuster 102 divides lifetimes 158 into second plurality of groups 162 based on second number of conditions 160.

Maintenance interval adjuster 102 determines a respective recommended maintenance interval for each group of second plurality of groups 162 based on respective lifetimes 158 for second maintenance task 156 of a respective group. Recommended maintenance intervals 164 for second plurality of groups 162 are based on lifetimes 158 for second maintenance task 156. Each of the respective recommended maintenance intervals 164 is an interval of time between performances of second maintenance task 156 that maximizes a probability that anomalies associated with second set of components 166 are detected during preventive scheduled maintenance.

Maintenance interval adjuster 102 calculates second time point 168 after which an acceptable amount of sensor data is available for a platform, such as platform 104, such that an analysis can be performed to determine if second number of conditions 160 is present for the platform. Second time point 168 can be measured in terms of usage cycles, usage time, or calendar days. When platform 104 is aircraft 154, second time point 168 is measured in a number of flight cycles, a number of flight hours, a number of calendar days, or any other desirable measurement type. In some illustrative examples, second time point 168 is described as a minimum quantity of cycles.

In some illustrative examples, maintenance interval adjuster 102 determines the respective recommended maintenance interval by performing customized maintenance program analysis 132 on each of second plurality of groups 162. In some illustrative examples, analysis results 134 of performing customized maintenance program analysis 132 on second plurality of groups 162 are sent to regulatory authorities for approval. Each of the distinct maintenance intervals is preapproved by the regulatory authorities based on the ability to monitor the condition and the statistical CMP analysis of each interval.

Platform 104 has second maintenance task 156 with second maintenance interval 170. Second maintenance interval 170 initially has second default value 172. Second default value 172 can be an original value such as an original equipment manufacturer (OEM) recommended maintenance interval. Second default value 172 can be fleet based. When second default value 172 is fleet based, second default value 172 is determined using a statistical analysis of data for all platforms of plurality of platforms 118 for second maintenance task 156.

In some illustrative examples, unscheduled downtime of platform 104 can be reduced by changing second maintenance interval 170 for performing second maintenance task 156 for platform 104. When second maintenance task 156 has an associated second plurality of groups 162 and platform 104 has second time point 174 greater than or equal to second time point 168, second sensor data 176 of platform 104 is analyzed for second number of conditions 160. In some illustrative examples, processor 146 of platform 104 determines if second sensor data 176 of platform 104 indicates second condition 178 affecting a frequency of maintenance task 116.

Second maintenance interval 170 for performing second maintenance task 156 for platform 104 is changed to second updated value 180 if second condition 178 affecting the frequency of second maintenance task 156 is indicated in second sensor data 176. In these illustrative examples, second updated value 180 is condition based. When second sensor data 176 does not indicate second condition 178 affecting the frequency of second maintenance task 156, second maintenance interval 170 remains at second default value 172.

Maintenance task 116 and second maintenance task 156 are different maintenance tasks. Recommended maintenance intervals 128 and recommended maintenance intervals 164 are not related to each other. Each of recommended maintenance intervals 128 and recommended maintenance intervals 164 are independently determined. In some illustrative examples, maintenance task 116 and second maintenance task 156 have at least common component between set of components 129 and second set of components 166. In some illustrative examples, maintenance task 116 and second maintenance task 156 do not have any common components between set of components 129 and second set of components 166.

In some illustrative examples, sensor data 144 and second sensor data 176 has at least some data overlap. In some other illustrative examples, sensor data 144 and second sensor data 176 has no overlap.

Maintenance task 116 is performed on platform 104 at or before maintenance interval 136. After updating maintenance interval 136, maintenance task 116 is performed on platform 104 at or before maintenance interval 136 having updated value 148. After performing maintenance task 116, a time point counter for sensor data 144 is reset to a default value. After performing maintenance task 116, maintenance interval 136 for performing maintenance task 116 is reset to default value 138.

The illustration of maintenance interval adjuster 102 and platform 104 in FIG. 1 is not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

For example, although two maintenance tasks are depicted in FIG. 1, any quantity of maintenance tasks may be present. The quantity of maintenance tasks being monitored for in service updates is related to the quantity of maintenance tasks with lifetimes having multiple modes. The quantity of maintenance tasks being monitored for in service updates is related to the quantity of maintenance tasks with conditions that are statistically significantly related to the multiple modes.

As another example, although maintenance task 116 is described as related to condition 147, maintenance task 116 may be related to any quantity of conditions. Further, although processor 146 is depicted as within platform 104, in other illustrative examples, processor 146 is outside of platform 104.

In some illustrative examples, database 182 having historical data 108 and maintenance interval adjuster 102 are part of a same computer system. In some other illustrative examples, database 182 and maintenance interval adjuster 102 are parts of different computer systems. In some illustrative examples, database 182 and maintenance interval adjuster 102 are controlled by different parties. For example, database 182 may be controlled and maintained by a client. In some examples, maintenance interval adjuster 102 is controlled and maintained by a services company.

Figure 2:
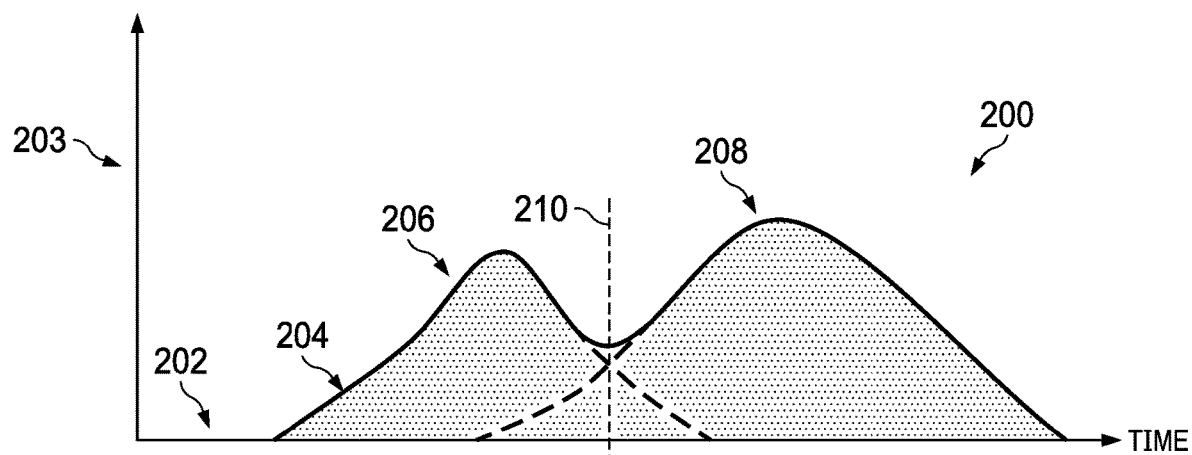
FIG. 2 is an illustration of a distribution of lifetimes for a maintenance task in accordance with an illustrative example.

Turning now to FIG. 2, an illustration of a distribution of lifetimes for a maintenance task is depicted in accordance with an illustrative example. Graph 200 has x-axis 202 of time and y-axis 203 of quantity. Data 204 depicts a quantity of instances of platforms having a lifetime along x-axis 202. Shorter lifetimes are closer to y-axis 203. Data 204 has two peaks, peak 206 and peak 208. Data 204 has multiple modes. In this instance, it is probable that lifetimes can be differentiated into two or more groups. Peak 206 and peak 208 may be divided by marker 210 illustrating a point for dividing for bimodality. After identifying that data 204 has potential multi-modality in lifetime distribution, sensor data is used to determine if the multi-modality is possibly a function of correlated operational conditions (not depicted).

Figure 3:
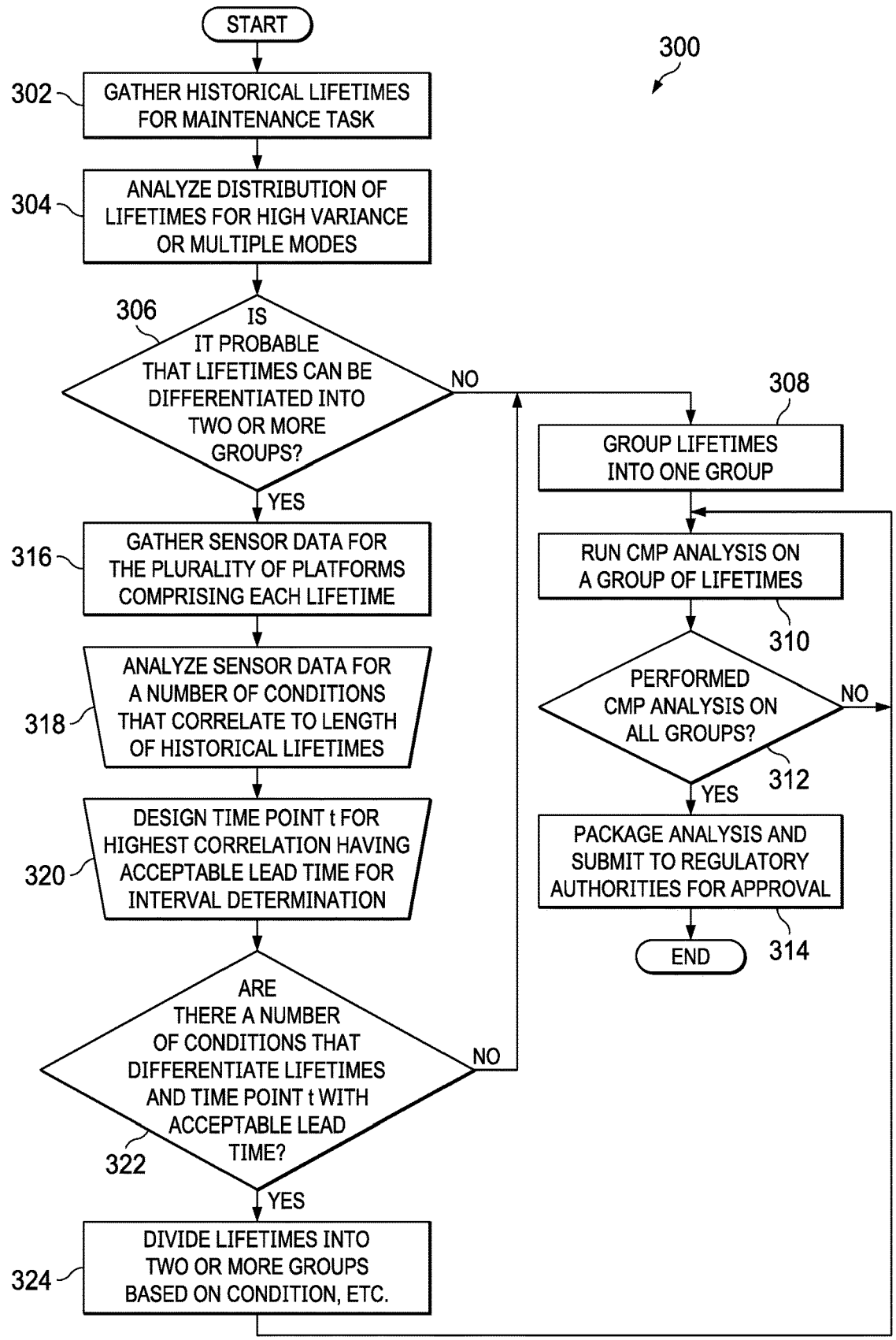
FIG. 3 is an illustration of a flowchart for utilizing a maintenance interval adjuster in accordance with an illustrative example.

Turning now to FIG. 3, an illustration of a flowchart for utilizing a maintenance interval adjuster is depicted in accordance with an illustrative example. In some illustrative examples, flowchart 300 is a depiction of a process that can be performed by maintenance interval adjuster 102 of FIG. 1. Flowchart 300 can be used to analyze data 204 of FIG. 2.

Historical lifetimes for a maintenance task are gathered (operation 302). The lifetimes for the maintenance task are gathered for a plurality of platforms controlled by an operator. For example, when the operator is a rental car agency the platforms are vehicles. As another example, when the operator is construction company, the platforms are construction equipment. In some illustrative examples, each platform of the plurality of platforms has a same type or a same model number.

A distribution of the lifetimes is analyzed for high variance or multiple modes (operation 304). Multiple modes are identified using any desirable test. In some illustrative examples, multiple modes are identified using one of Silverman's test, the Hall and York test, the excess mass test, or Bayesian mixture models. In some illustrative examples, multiple modes are identified using kernel density estimates or histogram-based methods known to those skilled in the art.

A determination is made if it is probable that lifetimes can be differentiated into two or more groups (operation 306). During the analysis, it is determined if the two or more groups are statistically significantly different. A statistically significant difference between two or more groups is determined using any desirable method. In some illustrative examples, a statistically significant difference between two or more groups is determined by an analysis of variance test, Kolmogorov-Smirnov test, or another desirable statistical test.

If it is not probable that lifetimes can be differentiated into two or more groups, the lifetimes are grouped into one group (operation 308). A CMP analysis is run on a group of lifetimes (operation 310). It is determined if a CMP analysis has been performed on all groups (operation 312). In some illustrative examples, the analysis is packaged and submitted to regulatory authorities for approval (operation 314). Each of the distinct maintenance intervals is preapproved by the regulatory authorities based on the ability to monitor the condition and the statistical CMP analysis of each interval.

If it is probable that lifetimes can be differentiated into two or more groups at operation 306, then sensor data is gathered for the plurality of platforms comprising each lifetime (operation 316). When the plurality of platforms is a plurality of aircraft, the sensor data takes the form of flight sensor data. The sensor data is analyzed for a number of conditions that correlate to length of historical lifetimes (operation 318). It is determined if a condition or condition(s) differentiate between the different groups. In some illustrative examples, a condition is identified by calculating accumulated statistics of the sensor values related to the maintenance and determining the statistic that has the strongest correlation with the different groups. The accumulated statistics are cumulative sums, cumulative maximums, cumulative variances, or other statistical values. The correlation is Pearson correlation or Spearman correlation between the accumulated statistics and the lengths of the historical lifetimes, or the correlation is an analysis of variance test or Kolmogorov-Smirnov test between the accumulated statistics and the categorical groups of historical lifetimes.

Time point, t, is designed for highest correlation having acceptable lead time for interval determination (operation 320). In these illustrative examples, t is the time prior to determining if a condition is present in the data. The time point, t, can be measured in terms of usage cycles, usage time, or calendar days.

It is determined if there are a number of conditions that differentiate lifetimes and time point, t, with acceptable lead time (operation 322). The lifetimes are divided into two or more groups based on condition (operation 324).

Afterwards, a CMP analysis is run on each of the groups of lifetimes (operations 310 and 312). In some illustrative examples, the analysis for all of the groups of lifetimes is packaged and submitted to regulatory authorities for approval (operation 314). After the analysis is submitted to regulatory authorities, flowchart 300 ends.

Figure 4:
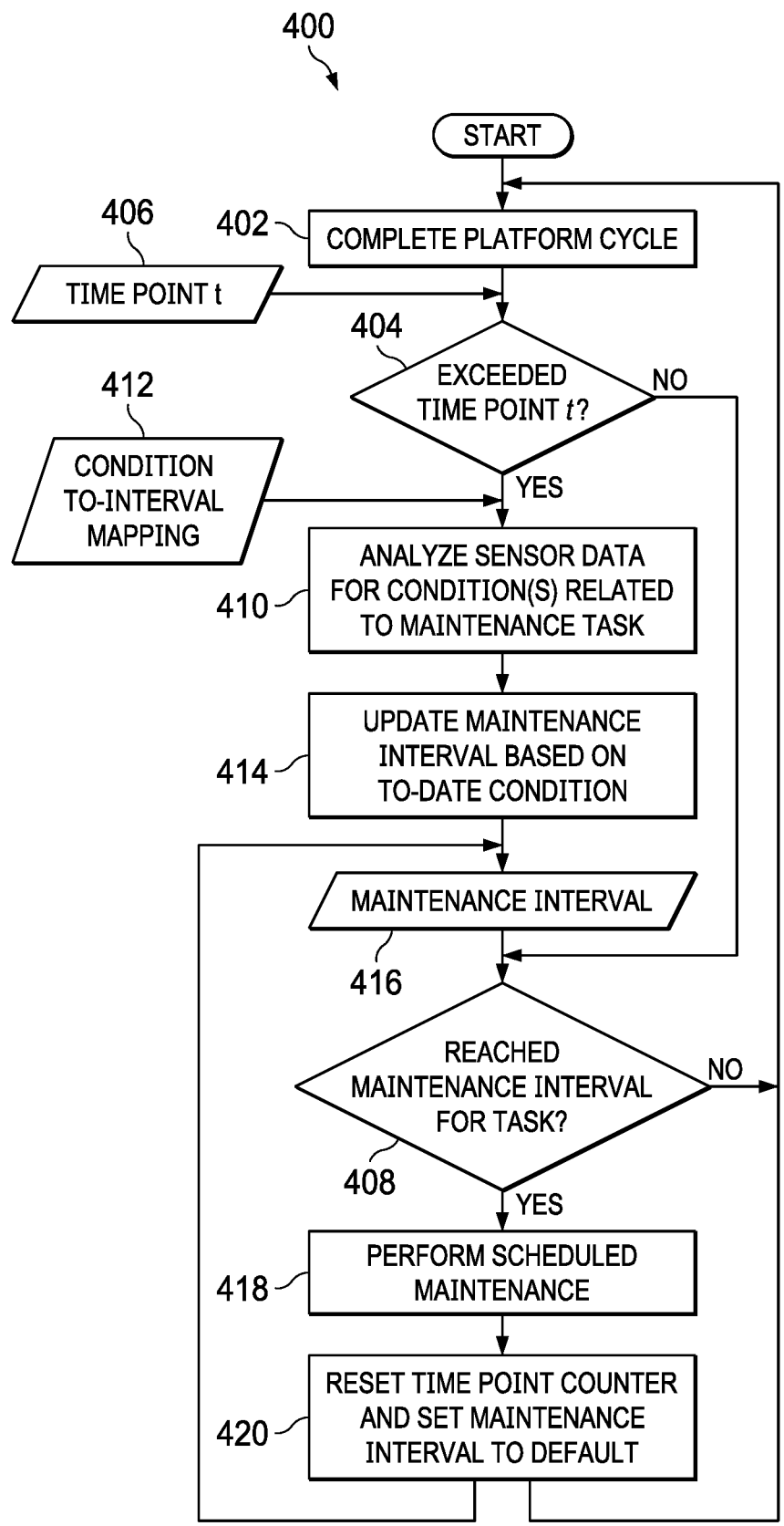
FIG. 4 is an illustration of a flowchart for adjusting a maintenance interval in accordance with an illustrative example.

Turning now to FIG. 4, an illustration of a flowchart for adjusting a maintenance interval is depicted in accordance with an illustrative example. In some illustrative examples, flowchart 400 is a depiction of a process that can be performed by processor 146 of FIG. 1. Flowchart 400 can be used to update a maintenance interval of platform 104 of FIG. 1. In some illustrative examples, flowchart 400 utilizes the number of conditions identified in flowchart 300 of FIG. 3.

A platform cycle is completed (operation 402). When the platform is an aircraft, the aircraft flight cycle is completed.

It is determined if a time point, t, has been exceeded (operation 404). The time point, t, is provided for the determination (operation 406). The time point, t, is generated by operation 320 of flowchart 300. Time point, t, can be measured in terms of usage cycles, usage time, or calendar days.

If time point, t, has not been exceeded at operation 404, it is determined if the maintenance interval for the maintenance task has been reached (operation 408). If the maintenance interval has not been reached, flowchart 400 returns to operation 402.

If the maintenance interval has been reached, the scheduled maintenance is performed (operation 418). After performing the maintenance task, the time point counter is reset and the maintenance interval is set to default (operation 420). When the time point counter is reset, the time point counter begins again at zero. When the maintenance interval is set to default, the maintenance interval is one of an original OEM maintenance interval or a fleet based CMP maintenance interval.

If time point, t, has been exceeded at operation 404, sensor data for condition(s) related to the maintenance task is analyzed (operation 410). Condition-to-interval mapping is provided to perform the analysis of sensor (operation 412). Condition-to-interval mapping is a product of the analysis of flowchart 300 of FIG. 3. Condition-to-interval mapping is a list of a number of conditions associated with respective maintenance intervals for a maintenance task.

A maintenance interval is updated based on a to-date condition (operation 414). If a condition is present that is associated with an updated value, the maintenance interval is changed to the updated value in operation 414. The updated value is a condition-based value. If a condition associated with an updated value is not present, the maintenance interval is unchanged from a prior value. In some illustrative examples, if a condition associated with an updated value is not present, the maintenance interval is maintained at a default value. Maintenance interval is provided (operation 416) to the determination if the maintenance interval has been reached for a task.

Figure 5:
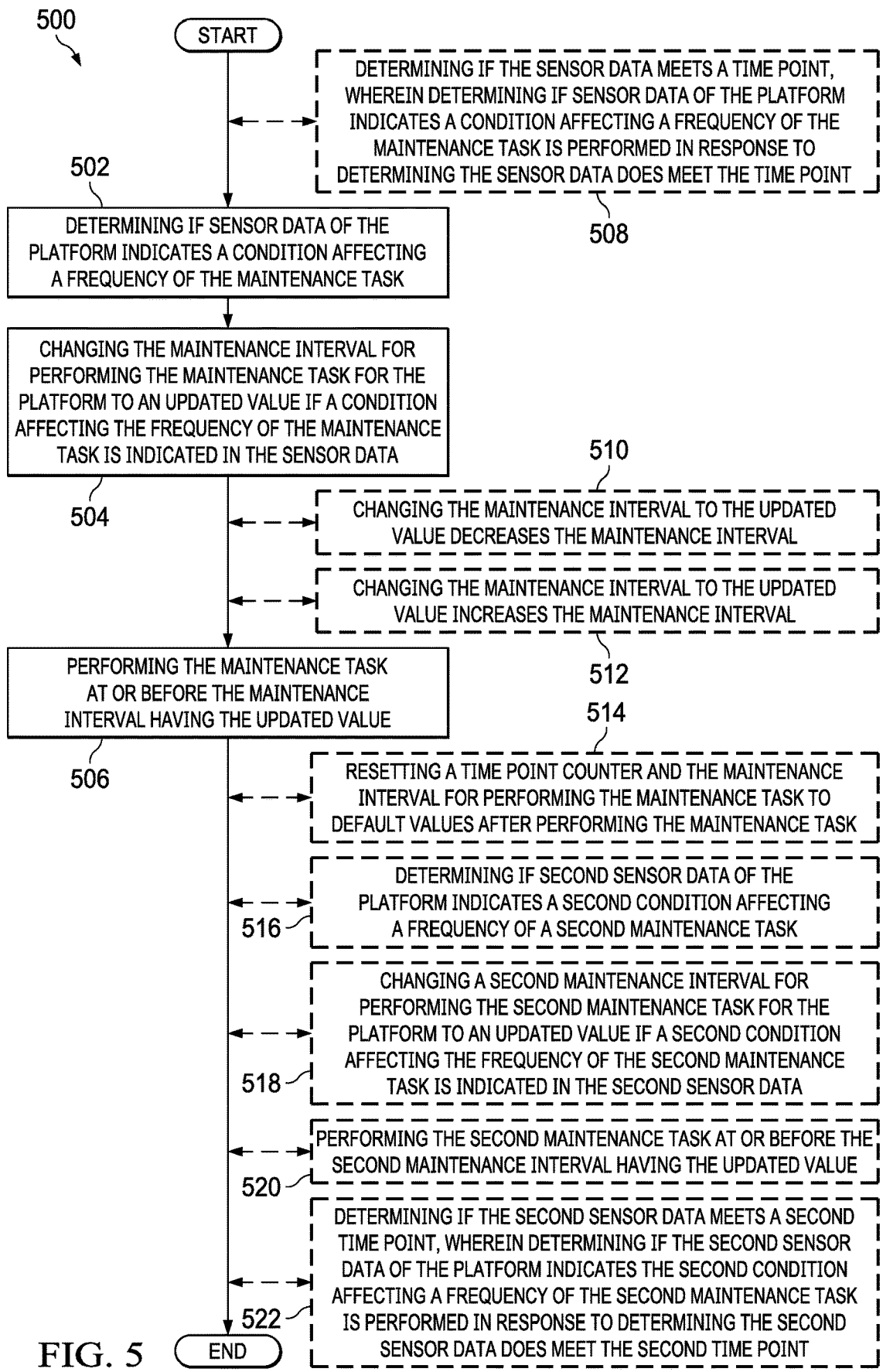
FIG. 5 is an illustration of a flowchart of a computer-implemented method of changing a maintenance interval for performing a maintenance task in accordance with an illustrative example.

Turning now to FIG. 5, an illustration of a flowchart of a computer-implemented method of changing a maintenance interval for performing a maintenance task is depicted in accordance with an illustrative example. Method 500 can be performed to update a maintenance interval of platform 104 of FIG. 1. Implementing method 500 can reduce unscheduled downtime by changing the maintenance interval. Implementing method 500 can reduce unnecessary downtime from unnecessarily frequent performance of a maintenance task.

It is determined if sensor data of the platform indicates a condition affecting a frequency of the maintenance task (operation 502). The condition is an observable condition that distinguishes between groups of lifetimes. The condition takes any desirable form that differentiates between the groups of lifetimes. In some illustrative examples, the condition is at least one of a sensor discrepancy, an out-of-tolerance sensor reading, a hard landing, or any other desirable condition. In some illustrative examples, the condition is one of whether a quantity of sensor discrepancies, a quantity of out-of-toleration readings for a sensor, a quantity of hard landings, or any other observable condition, as accumulated across all flights from the last reset of the time point counter until the time point, has or has not exceeded a specified threshold.

The maintenance interval for performing the maintenance task for the platform is changed to an updated value if a condition affecting the frequency of the maintenance task is indicated in the sensor data (operation 504). The updated value is assigned to the platform individually based on the presence of the condition. The maintenance task is performed at or before the maintenance interval having the updated value (operation 506). Afterwards, method 500 terminates.

In some illustrative examples, it is determined if the sensor data meets a time point, wherein determining if sensor data of the platform indicates a condition affecting a frequency of the maintenance task is performed in response to determining the sensor data does meet the time point (operation 508). The time period can be measured in terms of usage cycles, usage time, or calendar days. In some illustrative examples, the time point takes the form of a minimum number of cycles and determining if the sensor data meets the time point includes determining if the sensor data meets the minimum number of cycles.

In some illustrative examples, changing the maintenance interval to the updated value decreases the maintenance interval (operation 510). In some illustrative examples, changing the maintenance interval to the updated value increases the maintenance interval (operation 512). In some illustrative examples, a time point counter and the maintenance interval for performing the maintenance task are reset to default values after performing the maintenance task (operation 514).

In some illustrative examples, method 500 determines if second sensor data of the platform indicates a second condition affecting a frequency of a second maintenance task (operation 516). In some illustrative examples, the sensor data and the second sensor data have some overlap. In some illustrative examples, the sensor data and the second sensor data have no overlap.

In some illustrative examples, method 500 changes a second maintenance interval for performing the second maintenance task for the platform to an updated value if a second condition affecting the frequency of the second maintenance task is indicated in the second sensor data (operation 518). In some illustrative examples, method 500 performs the second maintenance task at or before the second maintenance interval having the updated value (operation 520). In some illustrative examples, method 500 determines if the second sensor data meets a second time point, wherein determining if the second sensor data of the platform indicates the second condition affecting a frequency of the second maintenance task is performed in response to determining the second sensor data does meet the second time point (operation 522).

Figure 6:
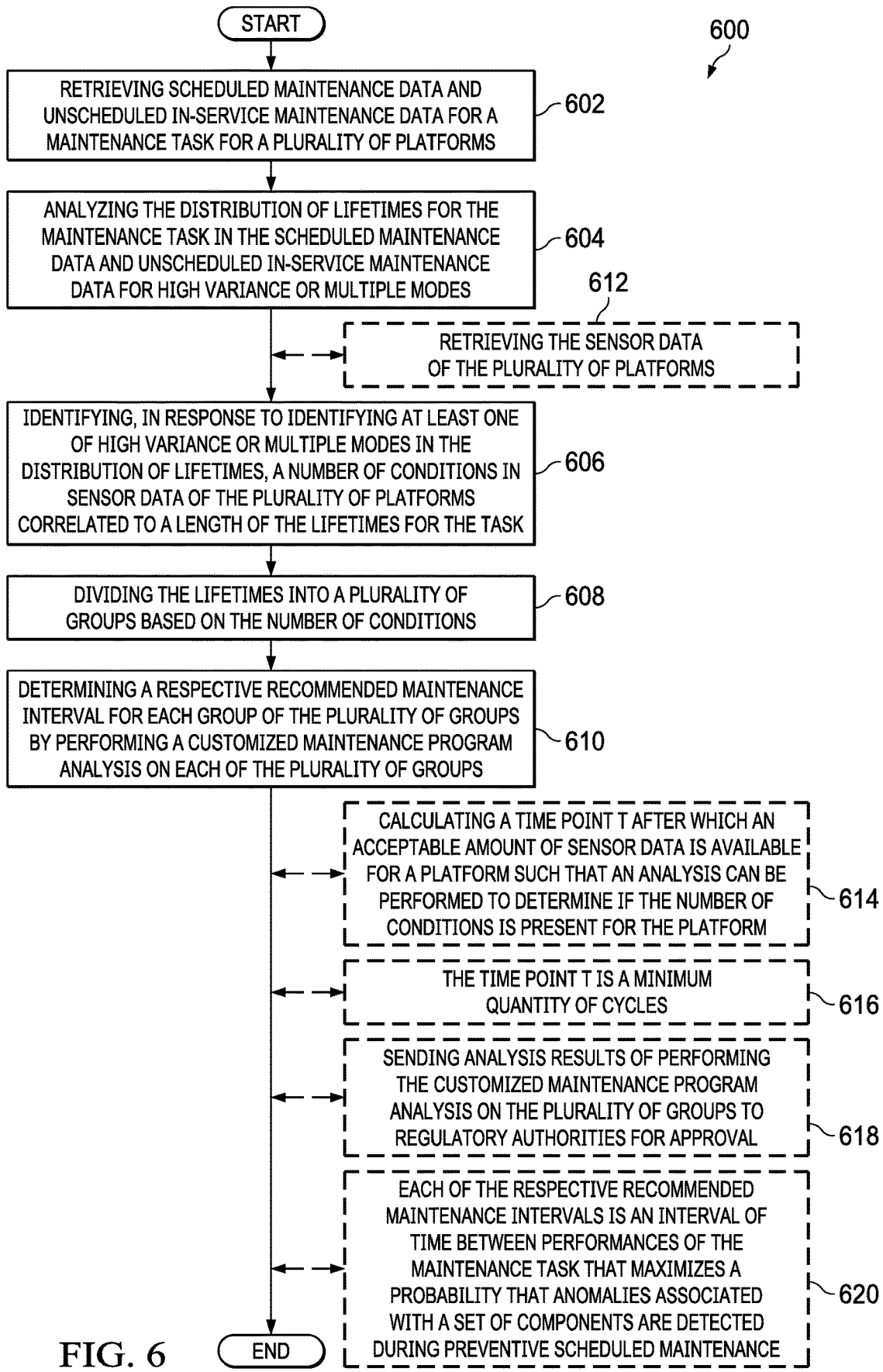
FIG. 6 is an illustration of a flowchart of a computer-implemented method of improving accuracy of maintenance scheduling in accordance with an illustrative example.

Turning now to FIG. 6, an illustration of a flowchart of a computer-implemented method of improving accuracy of maintenance scheduling is depicted in accordance with an illustrative example. Method 600 can be performed by maintenance interval adjuster 102 of FIG. 1. Method 600 can be performed using data 204 of FIG. 2.

Method 600 retrieves scheduled maintenance data and unscheduled in-service maintenance data for a maintenance task for a plurality of platforms (operation 602). Method 600 analyzes the distribution of lifetimes for the maintenance task in the scheduled maintenance data and unscheduled in-service maintenance data for high variance or multiple modes (operation 604). Method 600 identifies, in response to identifying at least one of high variance or multiple modes in the distribution of lifetimes, a number of conditions in sensor data of the plurality of platforms correlated to a length of the lifetimes for the task (operation 606). Method 600 divides the lifetimes into a plurality of groups based on the number of conditions (operation 608). Method 600 determines a respective recommended maintenance interval for each group of the plurality of groups by performing a customized maintenance program analysis on each of the plurality of groups (operation 610). Afterwards, method 600 terminates.

In some illustrative examples, the sensor data of the plurality of platforms is retrieved (operation 612). In some illustrative examples, method 600 calculates a time point after which an acceptable amount of sensor data is available for a platform such that an analysis can be performed to determine if the number of conditions is present for the platform (operation 614). In some illustrative examples, the time point is a minimum quantity of cycles (operation 616). In some illustrative examples, method 600 sends analysis results of performing the customized maintenance program analysis on the plurality of groups to regulatory authorities for approval (operation 618). In some illustrative examples, each of the respective recommended maintenance intervals is an interval of time between performances of the maintenance task that maximizes a probability that anomalies associated with a set of components are detected during preventative scheduled maintenance (operation 620).

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted examples illustrate the architecture, functionality, and operation of some possible implementations of apparatuses and methods in an illustrative example. In this regard, each block in the flowcharts or block diagrams may represent at least one of a module, a segment, a function, or a portion of an operation or step.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 508 through operation 514 may be optional. As another example, operation 612 through operation 620 may be optional.

Figure 7:
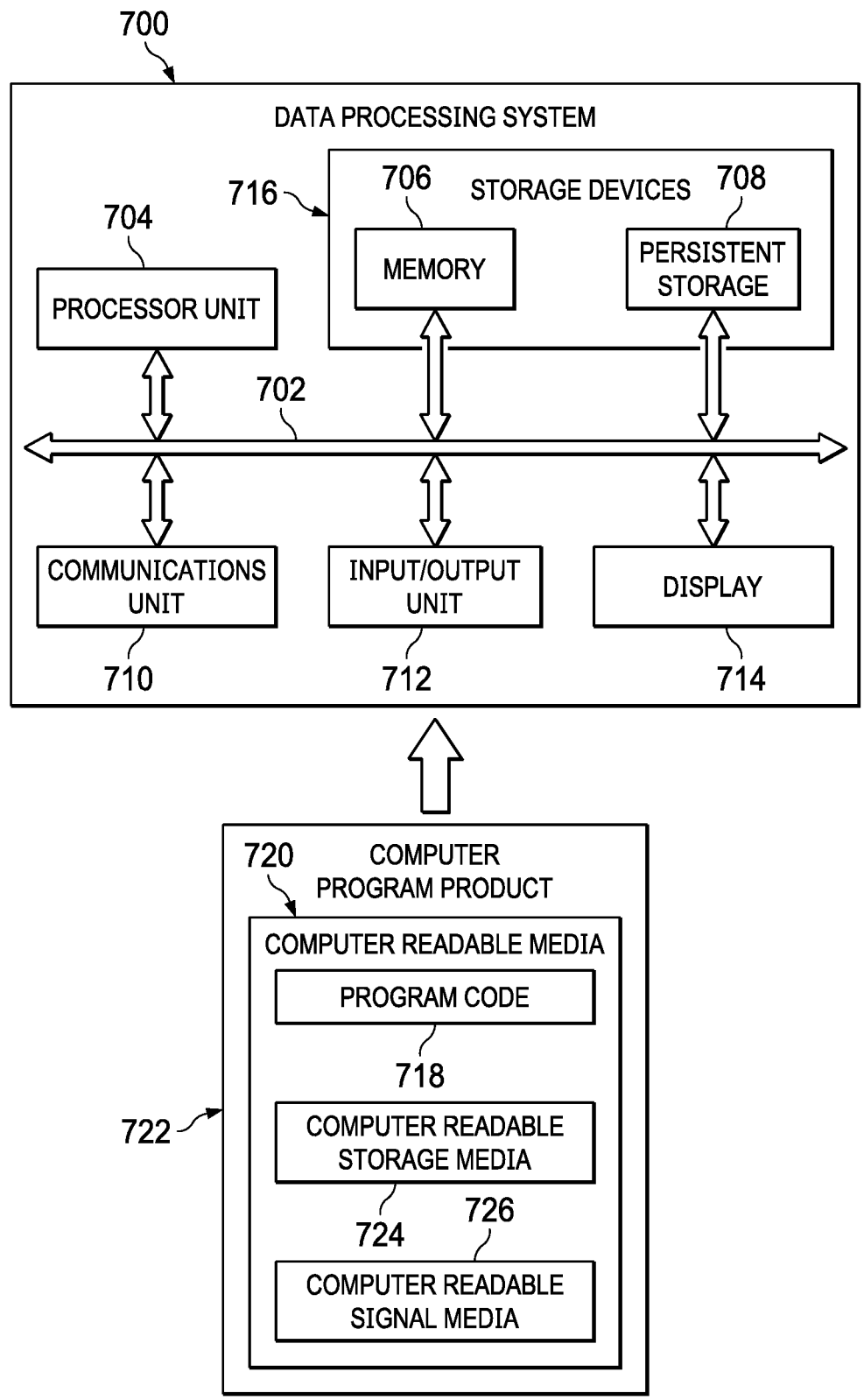
FIG. 7 is an illustration of a block diagram of a data processing system in accordance with an illustrative example.

Turning now to FIG. 7, an illustration of a block diagram of a data processing system is depicted in accordance with an illustrative example. Data processing system 700 may be used to implement one or more of maintenance interval adjuster 102 or processor 146 of FIG. 1. Data processing system 700 can be used to perform at least one of flowchart 300, flowchart 400, method 500, or method 600. In this illustrative example, data processing system 700 includes communications framework 702, which provides communications between processor unit 704, memory 706, persistent storage 708, communications unit 710, input/output unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation. In an example, processor unit 704 comprises one or more conventional general-purpose central processor units (CPUs). In an alternate example, processor unit 704 comprises one or more graphical processor units (CPUs).

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer-readable storage devices in these illustrative examples. Memory 706, in these examples, may be, for example, a random-access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these illustrative examples, provides for communications with other data processing systems or devices. In these illustrative examples, communications unit 710 is a network interface card. In some illustrative examples, communications unit 710 receives sensor data 124 of plurality of platforms 118.

Input/output unit 712 allows for input and output of data with other devices that may be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs may be located in storage devices 716, which are in communication with processor unit 704 through communications framework 702. The processes of the different examples may be performed by processor unit 704 using computer-implemented instructions, which may be located in a memory, such as memory 706.

These instructions are referred to as program code, computer-usable program code, or computer-readable program code that may be read and executed by a processor in processor unit 704. The program code in the different examples may be embodied on different physical or computer-readable storage media, such as memory 706 or persistent storage 708.

Program code 718 is located in a functional form on computer-readable media 720 that is selectively removable and may be loaded onto or transferred to data processing system 700 for execution by processor unit 704. Program code 718 and computer-readable media 720 form computer program product 722 in these illustrative examples. In one example, computer-readable media 720 may be computer-readable storage media 724 or computer-readable signal media 726.

Further, as used herein, "computer-readable media 720" can be singular or plural. For example, program code 718 can be located in computer-readable media 720 in the form of a single storage device or system. In another example, program code 718 can be located in computer-readable media 720 that is distributed in multiple data processing systems. In other words, some instructions in program code 718 can be located in one data processing system while other instructions in in program code 718 can be located in one data processing system. For example, a portion of program code 718 can be located in computer-readable media 720 in a server computer while another portion of program code 718 can be located in computer-readable media 720 located in a set of client computers.

The different components illustrated for data processing system 700 are not meant to provide architectural limitations to the manner in which different examples can be implemented. In some illustrative examples, one or more of the components may be incorporated in or otherwise form a portion of, another component. For example, memory 706, or portions thereof, can be incorporated in processor unit 704 in some illustrative examples. The different illustrative examples can be implemented in a data processing system including components in addition to or in place of those illustrated for data processing system 700. Other components shown in FIG. 7 can be varied from the illustrative examples shown. The different examples can be implemented using any hardware device or system capable of running program code 718.

In these illustrative examples, computer-readable storage media 724 is a physical or tangible storage device used to store program code 718 rather than a medium that propagates or transmits program code 718. Alternatively, program code 718 may be transferred to data processing system 700 using computer-readable signal media 726.

Computer-readable signal media 726 may be, for example, a propagated data signal containing program code 718. For example, computer-readable signal media 726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 700 are not meant to provide architectural limitations to the manner in which different examples may be implemented. The different illustrative examples may be implemented in a data processing system including components in addition to or in place of those illustrated for data processing system 700. Other components shown in FIG. 7 can be varied from the illustrative examples shown. The different examples may be implemented using any hardware device or system capable of running program code 718.

Figure 8:
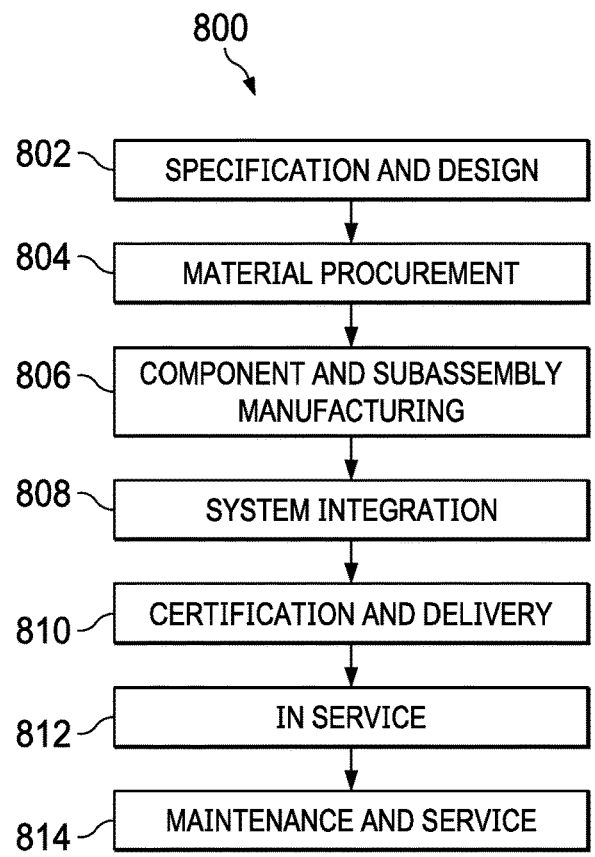
FIG. 8 is an illustration of an aircraft manufacturing and service method in a form of a block diagram in accordance with an illustrative example.
Figure 9:
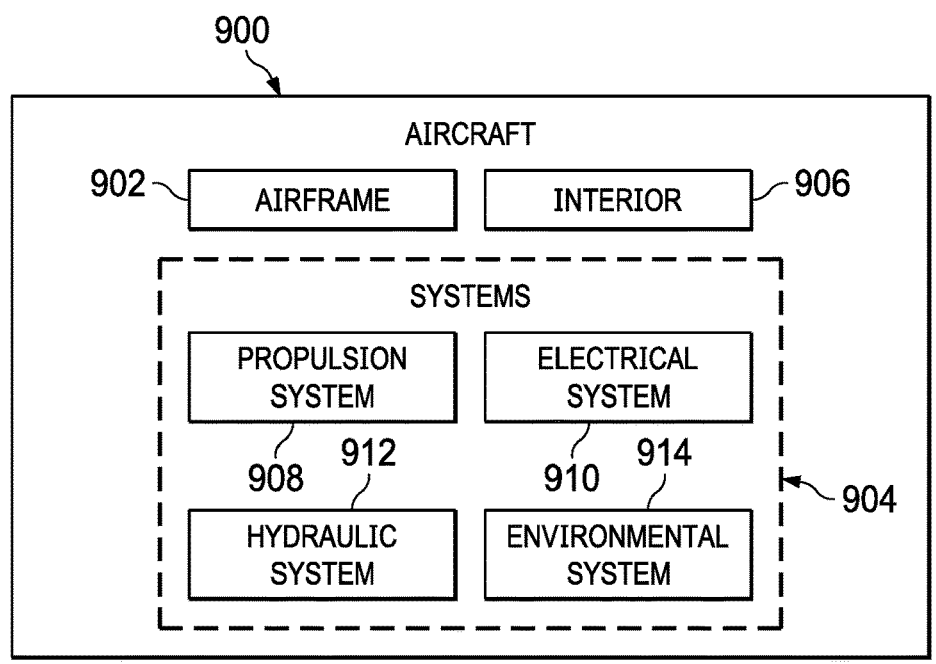
FIG. 9 is an illustration of an aircraft in a form of a block diagram in which an illustrative example may be implemented.

Illustrative examples of the present disclosure may be described in the context of aircraft manufacturing and service method 800 as shown in FIG. 8 and aircraft 900 as shown in FIG. 9. Turning first to FIG. 8, an illustration of an aircraft manufacturing and service method is depicted in accordance with an illustrative example. During pre-production, aircraft manufacturing and service method 800 may include specification and design 802 of aircraft 900 in FIG. 9 and material procurement 804.

During production, component and subassembly manufacturing 806 and system integration 808 of aircraft 900 takes place. Thereafter, aircraft 900 may go through certification and delivery 810 in order to be placed in service 812. While in service 812 by a customer, aircraft 900 is scheduled for routine maintenance and service 814, which may include modification, reconfiguration, refurbishment, or other maintenance and service.

Each of the processes of aircraft manufacturing and service method 800 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 9, an illustration of an aircraft is depicted in which an illustrative example may be implemented. In this example, aircraft 900 is produced by aircraft manufacturing and service method 800 of FIG. 8 and may include airframe 902 with plurality of systems 904 and interior 906. Examples of systems 904 include one or more of propulsion system 908, electrical system 910, hydraulic system 912, and environmental system 914. Any number of other systems may be included.

Apparatuses and methods embodied herein may be employed during at least one of the stages of aircraft manufacturing and service method 800. One or more illustrative examples may be used during in service 812, or maintenance and service 814 of FIG. 8. Method 500 may be performed during in service 812 to update a maintenance interval. A maintenance task with an updated maintenance interval from method 500 may be performed during maintenance and service 814 of FIG. 8.

Aircraft 900 may be the same as aircraft 154 of FIG. 1. Method 500 can be used to update a maintenance interval of a maintenance task for aircraft 900. As an example, method 500 may be used to update a maintenance interval for any of airframe 902, plurality of systems 904, or interior 906.

Method 600 can be used to set a recommended maintenance interval for a part of aircraft 900. Method 600 can be used to set a recommended maintenance interval for any of airframe 902, plurality of systems 904, or interior 906.

The illustrative examples provide an apparatus and methods for setting a condition-based efficient scheduled maintenance interval. The condition-based maintenance interval takes advantage of additional data sources for an individual aircraft. The condition-based maintenance interval also takes into account a statistical analysis of the data for a plurality of platforms having a same model or same features as the platform.

The illustrative examples determine potential multi-modality in lifetime distribution as a function of correlated operational conditions, resulting in dynamic interval recommendations.

The illustrative examples detect different groups of lifetimes that are dependent/correlated on some operational condition. For a condition to be a valid condition for maintenance interval analysis, one has to be able to dynamically monitor the operational condition.

A decision point where the correlation peaks is used as the time at which the actual maintenance interval is determined for the tail under consideration.

Different/modified scheduled maintenance intervals can be used for different subset of aircraft depending on the state of their monitored condition. Each of the distinct maintenance intervals is preapproved by the regulatory authorities based on the ability to monitor the condition and the statistical CMP analysis of each interval.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different features as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

Clause 1: A computer-implemented method comprising determining if sensor data of a platform indicates a condition affecting a frequency of a maintenance task; changing a maintenance interval for performing the maintenance task for the platform to an updated value if a condition affecting the frequency of the maintenance task is indicated in the sensor data; and performing the maintenance task at or before the maintenance interval having the updated value.

Clause 2: The method of Clause 1, wherein changing the maintenance interval to the updated value decreases the maintenance interval.

Clause 3: The method of Clause 1 or 2, wherein changing the maintenance interval to the updated value increases the maintenance interval.

Clause 4: The method of any of Clauses 1-3 further comprising resetting a time point counter and the maintenance interval for performing the maintenance task to default values after performing the maintenance task.

Clause 5: The method of any of Clauses 1-4 further comprising determining if the sensor data meets a time point, wherein determining if sensor data of the platform indicates a condition affecting a frequency of the maintenance task is performed in response to determining the sensor data does meet the time point.

Clause 6: The method of Clause 5, wherein the time point is one of a quantity of usage cycles, an amount of usage time, or a quantity of calendar days.

Clause 7: The method of any of Clauses 1-6 further comprising determining if second sensor data of the platform indicates a second condition affecting a frequency of a second maintenance task; changing a second maintenance interval for performing the second maintenance task for the platform to a second updated value if a second condition affecting the frequency of the second maintenance task is indicated in the second sensor data; and performing the second maintenance task at or before the second maintenance interval having the second updated value.

Clause 8: The method of Clause 7 further comprising determining if the second sensor data meets a second time point, wherein determining if the second sensor data of the platform indicates the second condition affecting a frequency of the second maintenance task is performed in response to determining the second sensor data does meet the second time point.

Clause 9: The method of any of Clauses 1-8 wherein the platform is an aircraft and the sensor data is flight sensor data.

Clause 10: A computer-implemented method of improving accuracy of maintenance scheduling, the method comprising retrieving scheduled maintenance data and unscheduled in-service maintenance data for a maintenance task for a plurality of platforms; analyzing a distribution of lifetimes for the maintenance task in the scheduled maintenance data and unscheduled in-service maintenance data for high variance or multiple modes; identifying, in response to identifying at least one of high variance or multiple modes in the distribution of lifetimes, a number of conditions in sensor data of the plurality of platforms correlated to a length of the lifetimes for the maintenance task; dividing the lifetimes into a plurality of groups based on the number of conditions; and determining a respective recommended maintenance interval for each group of the plurality of groups based on respective lifetimes for the maintenance task of a respective group.

Clause 11: The method of Clause 10 further comprising retrieving the sensor data of the plurality of platforms.

Clause 12: The method of Clause 10 or 11 further comprising calculating a time point after which an acceptable amount of sensor data is available for a platform such that an analysis can be performed to determine if the number of conditions is present for the platform.

Clause 13: The method of Clause 12, wherein the time point is a minimum quantity of cycles.

Clause 14: The method of any of Clauses 10-13, wherein each of the respective recommended maintenance intervals is an interval of time between performances of the maintenance task that maximizes a probability that anomalies associated with a set of components are detected during preventive scheduled maintenance.

Clause 15: An apparatus comprising a bus system; a communications system coupled to the bus system; and a processor unit coupled to the bus system, wherein the processor unit executes computer-usable program code to retrieve scheduled maintenance data and unscheduled in-service maintenance data for a maintenance task for a plurality of platforms; analyze a distribution of lifetimes for the maintenance task in the scheduled maintenance data and unscheduled in-service maintenance data for high variance or multiple modes; identify, in response to identifying at least one of high variance or multiple modes in the distribution of lifetimes, a number of conditions in sensor data of the plurality of platforms correlated to a length of the lifetimes for the maintenance task; divide the lifetimes into a plurality of groups based on the number of conditions; and determine a respective recommended maintenance interval for each group of the plurality of groups by performing a customized maintenance program analysis on each of the plurality of groups.

Clause 16: The apparatus of Clause 15, wherein the processor unit also sends analysis results of performing the customized maintenance program analysis on the plurality of groups to regulatory authorities for approval.

Clause 17: The apparatus of Clause 15 or 16 wherein the communications system receives the sensor data of the plurality of platforms.

Clause 18: The apparatus of any of Clauses 15-17, wherein the processor unit also calculates a time point after which an acceptable amount of sensor data is available for a platform such that an analysis can be performed to determine if the number of conditions is present for the platform.

Clause 19: The apparatus of Clause 18, wherein the time point is a minimum quantity of cycles.

Clause 20: The apparatus of any of Clauses 15-19, wherein each of the respective recommended maintenance intervals is an interval of time between performances of the maintenance task that maximizes a probability that anomalies associated with a set of components are detected on a respective platform during preventive scheduled maintenance.

What is claimed is:

1. A computer-implemented method comprising:
   determining if sensor data of a platform indicates a condition affecting a frequency of a maintenance task to be performed on the platform;
   changing a maintenance interval for performing the maintenance task for the platform to an updated value if a condition affecting the frequency of the maintenance task is indicated in the sensor data;
   performing the maintenance task on the platform at or before the maintenance interval having the updated value comprising scheduling the maintenance task, wherein the maintenance task comprises at least one of inspecting, maintaining, repairing and/or replacing a component or subcomponent on the platform; and
   resetting a time point counter and the maintenance interval for performing the maintenance task to default values after performing the maintenance task.

2. The method of claim 1, wherein changing the maintenance interval to the updated value decreases the maintenance interval.

3. The method of claim 1, wherein changing the maintenance interval to the updated value increases the maintenance interval.

4. The method of claim 1 further comprising:
   determining if the sensor data meets a time point, wherein determining if the sensor data of the platform indicates the condition affecting the frequency of the maintenance task is performed in response to determining the sensor data does meet the time point.

5. The method of claim 4, wherein the time point is one of a quantity of usage cycles, an amount of usage time, or a quantity of calendar days.

6. The method of claim 1 further comprising:
   determining if second sensor data of the platform indicates a second condition affecting a frequency of a second maintenance task;
   changing a second maintenance interval for performing the second maintenance task for the platform to a second updated value if a second condition affecting the frequency of the second maintenance task is indicated in the second sensor data; and
   performing the second maintenance task at or before the second maintenance interval having the second updated value.

7. The method of claim 6 further comprising:
   determining if the second sensor data meets a second time point, wherein determining if the second sensor data of the platform indicates the second condition affecting the frequency of the second maintenance task is performed in response to determining the second sensor data does meet the second time point.

8. The method of claim 1, wherein the platform is an aircraft and the sensor data is flight sensor data.

9. A computer-implemented method of improving accuracy of maintenance scheduling, the method comprising:
   retrieving scheduled maintenance data and unscheduled in-service maintenance data for a maintenance task to be performed for a plurality of platforms;
   analyzing a distribution of lifetimes for the maintenance task in the scheduled maintenance data and the unscheduled in-service maintenance data for high variance or multiple modes;
   identifying, in response to identifying at least one of the high variance or the multiple modes in the distribution of the lifetimes, a number of conditions in sensor data of the plurality of platforms correlated to a length of the lifetimes for the maintenance task;
   dividing the lifetimes into a plurality of groups based on the number of conditions;
   determining a respective recommended maintenance interval for each group of the plurality of groups based on respective lifetimes for the maintenance task of a respective group; and
   performing the maintenance task on the platform at or before the respective recommended maintenance interval for each group of the plurality of groups comprising scheduling the maintenance task, wherein the maintenance task comprises at least one of inspecting, maintaining, repairing and/or replacing a component or subcomponent on the platform.

10. The method of claim 9 further comprising:
    retrieving the sensor data of the plurality of platforms.

11. The method of claim 9 further comprising:
    calculating a time point after which an acceptable amount of sensor data is available for a platform such that an analysis can be performed to determine if the number of conditions is present for the platform.

12. The method of claim 11, wherein the time point is a minimum quantity of cycles.

13. The method of claim 9, wherein each of the respective recommended maintenance intervals is an interval of time between performances of the maintenance task that maximizes a probability that anomalies associated with a set of components are detected during preventive scheduled maintenance.

14. An apparatus comprising:
    a bus system;
    a communications system coupled to the bus system; and
    a processor unit coupled to the bus system, wherein the processor unit executes computer-usable program code to retrieve scheduled maintenance data and unscheduled in-service maintenance data for a maintenance task to be performed for a plurality of platforms;
    analyze a distribution of lifetimes for the maintenance task in the scheduled maintenance data and the unscheduled in-service maintenance data for high variance or multiple modes;
    identify, in response to identifying at least one of high variance or multiple modes in the distribution of lifetimes, a number of conditions in sensor data of the plurality of platforms correlated to a length of the lifetimes for the maintenance task;
    divide the lifetimes into a plurality of groups based on the number of conditions;
    determine a respective recommended maintenance interval for each group of the plurality of groups by performing a customized maintenance program analysis on each of the plurality of groups; and
    perform the maintenance task on the platform at or before the respective recommended maintenance interval for each group of the plurality of groups comprising scheduling the maintenance task, wherein the maintenance task comprises at least one of inspecting, maintaining, repairing and/or replacing a component or subcomponent on the platform.

15. The apparatus of claim 14, wherein the processor unit also sends analysis results of performing the customized maintenance program analysis on the plurality of groups to regulatory authorities for approval.

16. The apparatus of claim 14, wherein the communications system receives the sensor data of the plurality of platforms.

17. The apparatus of claim 14, wherein the processor unit also calculates a time point after which an acceptable amount of sensor data is available for a platform such that an analysis can be performed to determine if the number of conditions is present for the platform.

18. The apparatus of claim 17, wherein the time point is a minimum quantity of cycles.

19. The apparatus of claim 14, wherein each of the respective recommended maintenance intervals is an interval of time between performances of the maintenance task that maximizes a probability that anomalies associated with a set of components are detected on a respective platform during preventive scheduled maintenance.

20. A computer-implemented method comprising:

determining if sensor data of a platform indicates a condition affecting a frequency of a maintenance task to be performed on the platform;

changing a maintenance interval for performing the maintenance task for the platform to an updated value if a condition affecting the frequency of the maintenance task is indicated in the sensor data;

performing the maintenance task on the platform at or before the maintenance interval having the updated value comprising scheduling the maintenance task, wherein the maintenance task comprises at least one of inspecting, maintaining, repairing and/or replacing a component or subcomponent on the platform; and determining if the sensor data meets a time point, wherein determining if sensor data of the platform indicates the condition affecting the frequency of the maintenance task is performed in response to determining the sensor data does meet the time point, wherein the time point is one of a quantity of usage cycles, an amount of usage time, or a quantity of calendar days.

* * * * *